(12) United States Patent
McDermid

(10) Patent No.: US 7,864,259 B1
(45) Date of Patent: Jan. 4, 2011

(54) ENCLOSURE WITH INTEGRATED BACKLIGHT FOR AN LCD DISPLAY

(76) Inventor: William J McDermid, 8246 Willow La., Niwot, CO (US) 80503

( * ) Notice: Subject to any disclaimer, the term of this patent is extended or adjusted under 35 U.S.C. 154(b) by 288 days.

(21) Appl. No.: 12/104,100

(22) Filed: Apr. 16, 2008

Related U.S. Application Data

(60) Provisional application No. 60/914,072, filed on Apr. 26, 2007.

(51) Int. Cl.
*G02F 1/1333* (2006.01)

(52) U.S. Cl. ........................................ 349/58

(58) Field of Classification Search ........................ None
See application file for complete search history.

(56) References Cited

U.S. PATENT DOCUMENTS 7,072,096 B2 * 7/2006 Holman et al. .............. 359/298

7,213,937 B2 * 5/2007 Tsai ............................ 362/224

\* cited by examiner

*Primary Examiner*—Sung H Pak
(74) *Attorney, Agent, or Firm*—Duft Bornsen & Fishman, LLP

(57) ABSTRACT

Apparatuses and methods are provided for housing electrical components (312) of an electronic device in an enclosure (300) with an integrated backlight for a liquid crystal display (LCD) of the electronic device. An enclosure comprises a back plate (306), with a plurality of light sources (308) coupled to the back plate. The light sources provide back light for the LCD. The enclosure also comprises a plurality of spacers (310) which are coupled to a diffuser (304) of the LCD. Each spacer is adapted to optically couple to a corresponding light source to transmit light from the light source to the diffuser. The spacers are also adapted to secure electrical components in place between multiple spacers. Thus, non-display electrical components (1202) and display components may be housed within a single enclosure, which results in a significantly thinner device than prior art devices utilizing compartmentalized LCD displays.

25 Claims, 13 Drawing Sheets

ENCLOSURE WITH INTEGRATED BACKLIGHT FOR AN LCD DISPLAY

CROSS REFERENCE TO RELATED APPLICATIONS

This non-provisional application claims priority to U.S. provisional application 60/914,072, filed on Apr. 26, 2007, which is incorporated herein by reference.

BACKGROUND OF THE INVENTION

1. Field of the Invention

This invention relates to a method of operating and apparatus for an electronic device having an optical display. This invention further relates to a method of operating and apparatus for positioning the optical display elements of an electronic device, such as a laptop computer or tablet PC, with the electronics and other component's of the electronic device 2. Statement of the Problem Many electronic devices, such as laptops, tablet PCs, personal digital assistants (PDAs), mobile telephones, MP3 players, etc., have a glass LCD screen for displaying information to a user. For electronic devices, it is desirable that the devices be lightweight and small in size, especially for portable devices, where small sizes enable a user to carry and operate the device in many portable settings. Many currently available electronic devices, such as laptop computers and PDAs are unacceptably large, thick, heavy, or otherwise not ideal for portable use.

Electronic devices with LCD displays contain a light source, which generates light that is transmitted to the LCD glass screen, which selectively transmits the received light to display information processed by the device. It is known to optically couple the output of the light source to a diffuser that transmits the light to the LCD glass screen. Many prior art electronic devices have the optical components in an upper chamber and have a separate lower chamber which contains electrical circuit elements and other elements required by the electronic device for its operation, such as processors, memory, etc. This lower chamber is below the upper portion of the electronic device containing the optical elements such as the light source, the diffuser, the LCD screen and other optical elements of the electronic device.

LCD displays of electronic devices are known in which a single light source, together with a single diffuser, generates and transmits light to the LCD glass. It is also known to use a plurality of spaced apart light sources to provide light to the LCD glass. The use of multiple light sources may provide light of an improved quality to the LCD glass. Most prior art electronic devices locate the circuit elements required to operate the device in a separate chamber on the bottom of the computer. The use of a separate chamber to store these elements often results in an inefficient use of this bottom space. This inefficiency results in an electronic device that may be larger or thicker than necessary, and is inconvenient for portable use.

It can be seen in view of the above that prior art electronic devices with LCD displays often do not fulfill a user's needs and requirements with regard to weight, size, and volume.

SUMMARY OF THE SOLUTION

The present invention overcomes the above and other problems by the provision of an electronic device that is lighter, smaller and has a reduced volume which more efficiently uses a common chamber to mount the light generating elements and the other elements of the electronic device and uses the diffuser as a structure element of the case. The method and apparatus of the present invention includes an LCD glass that selectively transmits light representing information to be displayed to a user. This light is transmitted to the LCD glass from a plurality of light sources via a diffuser and a plurality of translucent spacers, which are positioned between the diffuser and the light sources. The bottom portion of the electronic device comprises a back plate, which may be the bottom surface of the electronic device. The common space between the diffuser and the back plate includes circuitry and other elements required by the electronic device for its operation. This space also includes the aforementioned light sources. These elements including the light sources and the electrical components share a common space in which these devices are essentially comingled as to minimize the overall volume, weight and thickness of the electronic device. The translucent spacers, each of which is individual to a different light source, transmit the light generated by its associated light source through the spacer and diffuser to the LCD glass in the upper portion of the electronic device. These spacers also secure electrical components, such as processors, memory, etc., in place in the common space.

In accordance with a first embodiment of the invention, the light sources may be positioned in the common volume with the other electrical components with space being provided to dispose the electrical components in between spacers optically coupled to the light sources. Light from each light source may pass through the spacer for transmission via the diffuser to the LCD glass.

In accordance with another embodiment, the structural integrity of the case is realized by the diffuser and the back plate being attached at the spacer locations so the side of the case can be a non-structural, shock-absorbing, sealing band.

In accordance with another embodiment, the components forming the work elements of the electronic device may be embodied in various possible embodiments that are described in further detail in a co-pending application by the same inventor ("Method and Apparatus For Interconnecting Circuit Boards", U.S. Provisional Application Ser. No. 60/911,117), which is hereby incorporated by reference. This functionality enables the work elements of the electronic device such as power supplies, processors, memory, etc., to be controllably positioned within the spacers. This functionality further enables the easy removal and replacement of one or more components for maintenance purposes.

In accordance with another embodiment, the back plate or back plane of the electronic device may embody the main circuit board with the elements of the electronic device.

In accordance with another embodiment, means may be provided within a portion of the spacers for receiving securing apparatuses which secure the back plate, the diffusers and the spacers.

In accordance with another embodiment of the invention, one or more of the electrical components of the device may contain a cut out through which a spacer is adapted to pass through to permit the transmission of light from an associated light source through the spacer and diffuser to the LCD glass.

Aspects

One aspect of the invention is an enclosure of an electronic device with integrated backlight for housing electrical components for an LCD, the enclosure comprising: a diffuser; a plurality of light sources adapted to provide backlight for the LCD; and a plurality of spacers optically coupled to the diffuser and optically coupled to the plurality of light sources and adapted to transmit light from the plurality of light sources to the diffuser, the plurality of spacers further adapted to secure at least one electrical component in place between the plurality of spacers.

Preferably, the enclosure comprises a back plate, and the light sources are coupled to the back plate.

Preferably, the back plate comprises a heat spreader.

Preferably, the back plate comprises a main circuit board for the electronic device.

Preferably, a portion of the plurality of spacers comprises a means for receiving a securing apparatus to secure the back plate, the spacers and the diffuser.

Preferably, the electrical component comprises a cut-out on each of the four corners of the electrical component, each cut-out adapted to pass through a spacer to secure the electrical component in place around the spacer.

Preferably, the spacers are arranged in a grid pattern, each spacer being equally spaced apart in an X-direction and a Y-direction of the enclosure.

Preferably, the electrical component comprises a circuit board having: a cut-out on each of the four corners of the circuit board, each cut-out adapted to pass through a spacer to secure the circuit board in place around the spacer; and wherein sizes of each edge of the circuit board are integer multiples of a base value, with the base value equal to a distance between centers of two of the plurality of spacers.

Preferably, the electrical component comprises a module including: a first circuit board having a first surface; a second circuit board having a first surface, the first surface of the second circuit board disposed facing the first surface of the first circuit board; an apparatus adapted to physically and electrically couple the first circuit board and the second circuit board, and further adapted to matingly engage the module with a second module; and a cut-out on each of the four corners of the first and second circuit boards, each cut-out adapted to pass through a spacer to secure the module in place around the spacer; wherein sizes of each edge of the circuit board are integer multiples of a base value, with the base value equal to a distance between centers of two of the plurality of spacers.

Preferably, the electrical component comprises a battery.

Another aspect of the invention is an enclosure for housing electrical components of an electronic device with integrated backlight for an LCD, the enclosure comprising: an LCD glass; a diffuser below the LCD glass; a back plate comprising circuitry for controlling the LCD; a plurality of light sources coupled to the back plate and adapted to provide backlight for the LCD; a plurality of spacers optically coupled to the diffuser and optically coupled to the plurality of light sources and adapted to transmit light from the plurality of light sources to the diffuser, the plurality of spacers further adapted to secure at least one electrical component in place between the plurality of spacers; and an apparatus adapted to fit around the back plate, the diffuser, and the LCD glass to secure the back plate, the diffuser, and the LCD glass.

Preferably, the back plate comprises an aluminum heat spreader.

Preferably, a portion of the plurality of spacers comprises a means for receiving a securing apparatus to secure the spacers, the diffuser and the back plate.

Preferably, the plurality of spacers are arranged in a grid pattern, each spacer being equally spaced apart in an X-direction and a Y-direction of the enclosure.

Preferably, the electrical component comprises a circuit board, the circuit board comprising: a cut-out on each of the four corners of the circuit board, each cut-out adapted to pass through a spacer to secure the circuit board in place around the spacers; and wherein sizes of each edge of the circuit board are integer multiples of a base value, with the base value equal to a distance between centers of two of the plurality of spacers.

Preferably, the electrical component comprises a battery.

Another aspect of the invention is a method for housing electrical components in an enclosure with integrated backlight for an LCD, the method comprising: incorporating a diffuser into the enclosure; incorporating a back plate into the enclosure; coupling a plurality of light sources to the back plate to provide backlight for the LCD; optically coupling a plurality of spacers to the diffuser; optically coupling the plurality of spacers to the plurality of light sources to transmit light from the plurality of light sources to the diffuser; and securing at least one electrical component in place between the plurality of spacers.

The invention may include other exemplary embodiments described below.

DESCRIPTION OF THE DRAWINGS

The above and other advantages and features of the invention may be better understood from a reading of the detailed description taken in conjunction with the drawings in which the same reference number represents the same element or similar type of element on all drawings.

DETAILED DESCRIPTION OF THE INVENTION

FIGS. 3-20 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
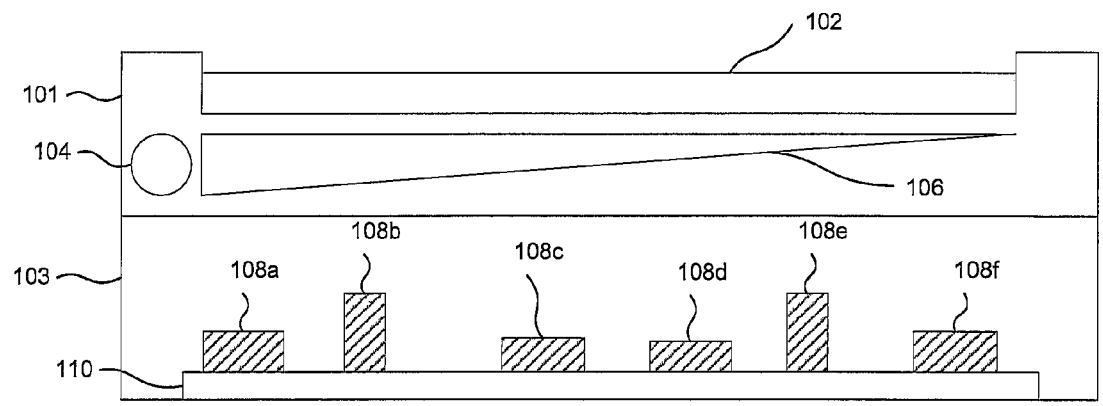
FIG. 1 illustrates a side view of a prior art electronic device (e.g., a personal digital assistant (PDA)) with an LCD display.

FIG. 1 illustrates a side view of a prior art electronic device 100 (e.g., a personal digital assistant (PDA)) with an LCD display. The components of the LCD display are enclosed within LCD enclosure 101. Non-display components (e.g., memory, processors, etc.) of electronic device 100 are housed within a separate enclosure 103. LCD enclosure 101 is stacked above enclosure 103.

Prior art electronic device 100 includes an LCD glass 102 which receives back light from cold fluorescent tube (CFT) 104. Light from CFT 104 is diffused and transmitted by diffuser 106. The backlight for LCD glass 102 emanates from a single source, so diffuser 106 is of varying height across the length of its surface to properly diffuse light from CFT 104 across the surface of LCD glass 102. As such, there is a significant amount of un-utilized space within LCD enclosure 101.

Within enclosure 103 is a main circuit board 110 of electronic device 100 connecting a plurality of components 108a to 108f. Because of the non-uniform height of components 108, there is un-utilized space within enclosure 103. Also, due to the compartmentalized nature of the LCD components of electronic device 100, there is a significant amount of un-utilized space within electronic device 100. As such, the height of electronic device 100 may be significantly larger than desired for smaller devices, such as PDAs, tablet PCs, mobile phones, MP3 players, etc.

Figure 2:
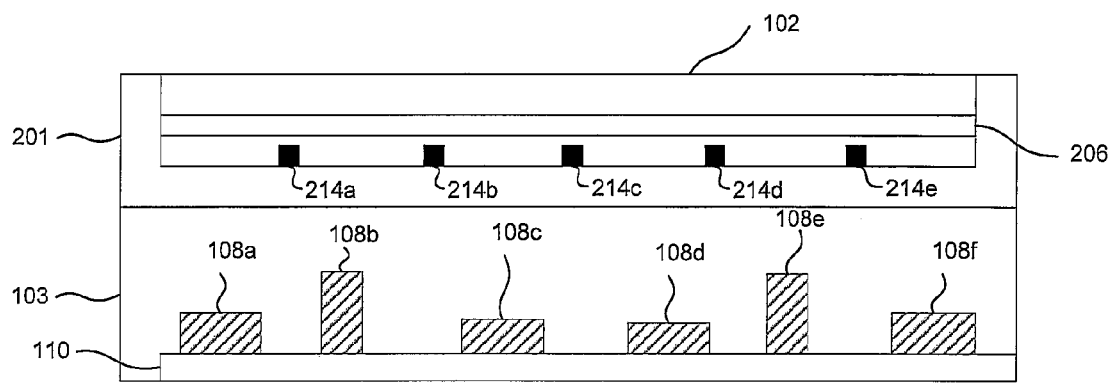
FIG. 2 illustrates a side view of another prior art electronic device with an LCD display.

FIG. 2 illustrates a side view of another prior art electronic device 200 with an LCD display. Prior art electronic device 200 utilizes a plurality of LEDs 214a to 214e for providing backlight to LCD glass 102. This allows electronic device 200 to utilize a smaller diffuser 206 than diffuser 106 of electronic device 100 in FIG. 1. However, electronic device 200 is still compartmentalized into LCD enclosure 201 and enclosure 103, with enclosure 103 housing non-display electrical components 108a to 108f. As such, there is still a significant amount of un-utilized space within electronic device 200.

Figure 3:
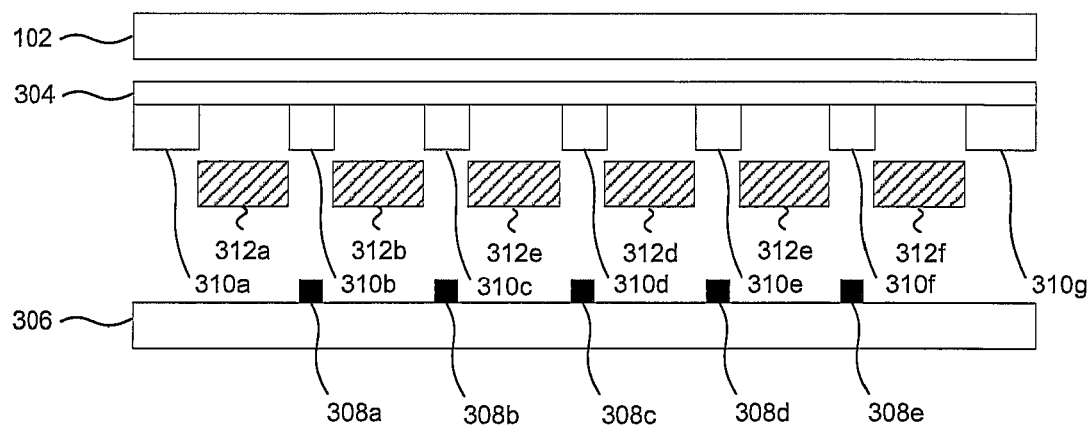
FIG. 3 illustrates an exploded side view of an enclosure of an electronic device with an integrated backlight for housing electrical components in an exemplary embodiment of the invention.

FIG. 3 illustrates an exploded side view of an enclosure 300 of an electronic device with an integrated backlight for housing electrical components in an exemplary embodiment of the invention. Enclosure 300 integrates components of an LCD display into the space where non-display electrical components of the electronic device are housed. More specifically, enclosure 300 houses LCD backlight components, such as light sources 308a to 308e, within the same space as processors, memory, etc. (e.g., electrical components 312a to 312f) of the electronic device. Enclosure 300 may be integrated into any type of electronic device utilizing an LCD display, such as PDAs, tablet PCs, mobile phones, MP3 players, hand held video game systems, etc.

Enclosure 300 includes standard LCD components, such as LCD glass 102 and diffuser 304. Enclosure 300 also includes a back plate 306 with a plurality of light sources 308a to 308e disposed on the surface of back plate 306. Light sources 308a to 308e may be any type of device adapted to provide appropriate backlight for an LCD display, such as white LEDs. Back plate 306 may include circuitry (not shown) for controlling light sources 308a to 308e. Back plate 306 may also form a back surface of the electronic device (e.g., the non-display surface of a PDA).

Enclosure 300 also includes a plurality of spacers 310a to 310g. Spacers 310 may be optically and/or physically coupled to diffuser 304 and adapted to fit over and/or optically couple to light sources 308. Spacers 310 act as light pipes to transmit light from light sources 308 to diffuser 304. Diffuser 304 and spacers 310 may be formed of a clear acrylic material. Diffuser 304 and spacers 310 may further comprise a single piece of molded clear acrylic material.

Spacers 310 are further adapted to secure electrical components 312 in place between multiple spacers 310. Electrical components 312 are placed in between several spacers 310. Spacers 310 secure electrical components 312 in an X-direction and a Y-direction of enclosure 300. Diffuser 304 and back plate 306 may secure electrical components 312 in place in a Z-direction of enclosure 300.

Electrical components 312 may be modular electrical components (to be described below), which may be of uniform size and secured by contact pressure in between spacers 310. The dimensions of the modular electronic components may also be integer multiples of a uniform base value such that each module fits within four or more spacers 310. As such, each electrical component 312 does not need to be soldered or otherwise physically connected to any surface of enclosure 300.

In another exemplary embodiment of the invention to be described below, back plate 306 may comprise a main circuit board of the electronic device, and electrical components 312 may be physically disposed on back plate 306. All of electrical components 312a to 310f may also be a single circuit board or module which fits around spacers 310. In this embodiment, to be described below, the circuit board may have a plurality of holes for fitting through spacers 310 to secure the circuit board between spacers 310. Those of ordinary skill in the art will recognize a variety of equivalent electrical component structures which may be utilized to fit within enclosure 300 and between spacers 310. While spacers 310 and electrical components 312 have been described in regard to a square grid, the spacing and shape of spacers 310, electrical components 312, and the grid may take the form of any shape, including rectangles, L-shapes, U-shapes, non-parallelepipeds, etc.

Figure 4:
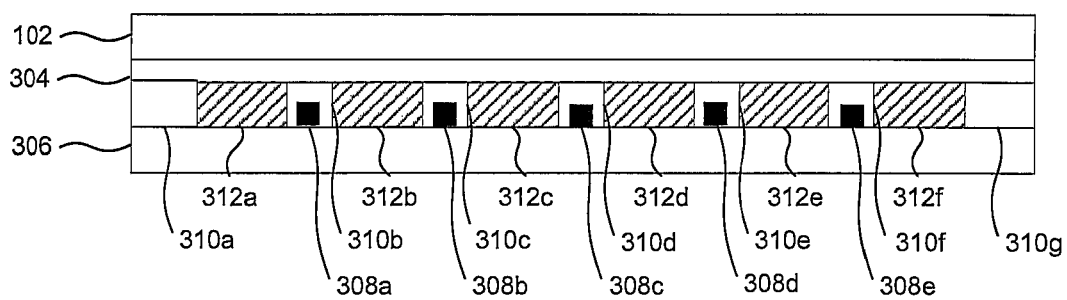
FIG. 4 illustrates an assembled side view of the enclosure of FIG. 3 in an exemplary embodiment of the invention.

FIG. 4 illustrates an assembled side view of enclosure 300 of FIG. 3 in an exemplary embodiment of the invention. Enclosure 300 includes LCD components for an LCD display, as well as electrical components (e.g., processors, memory, etc.) utilized by an electronic device. The display and non-display components are integrated into a single enclosure, which is significantly thinner than electronic device 100 of FIG. 1 or electronic device 200 of FIG. 2. The elements of enclosure 300 illustrated in FIGS. 3-4 may not be all inclusive, and may include other elements not shown for the sake of brevity.

Figure 5:
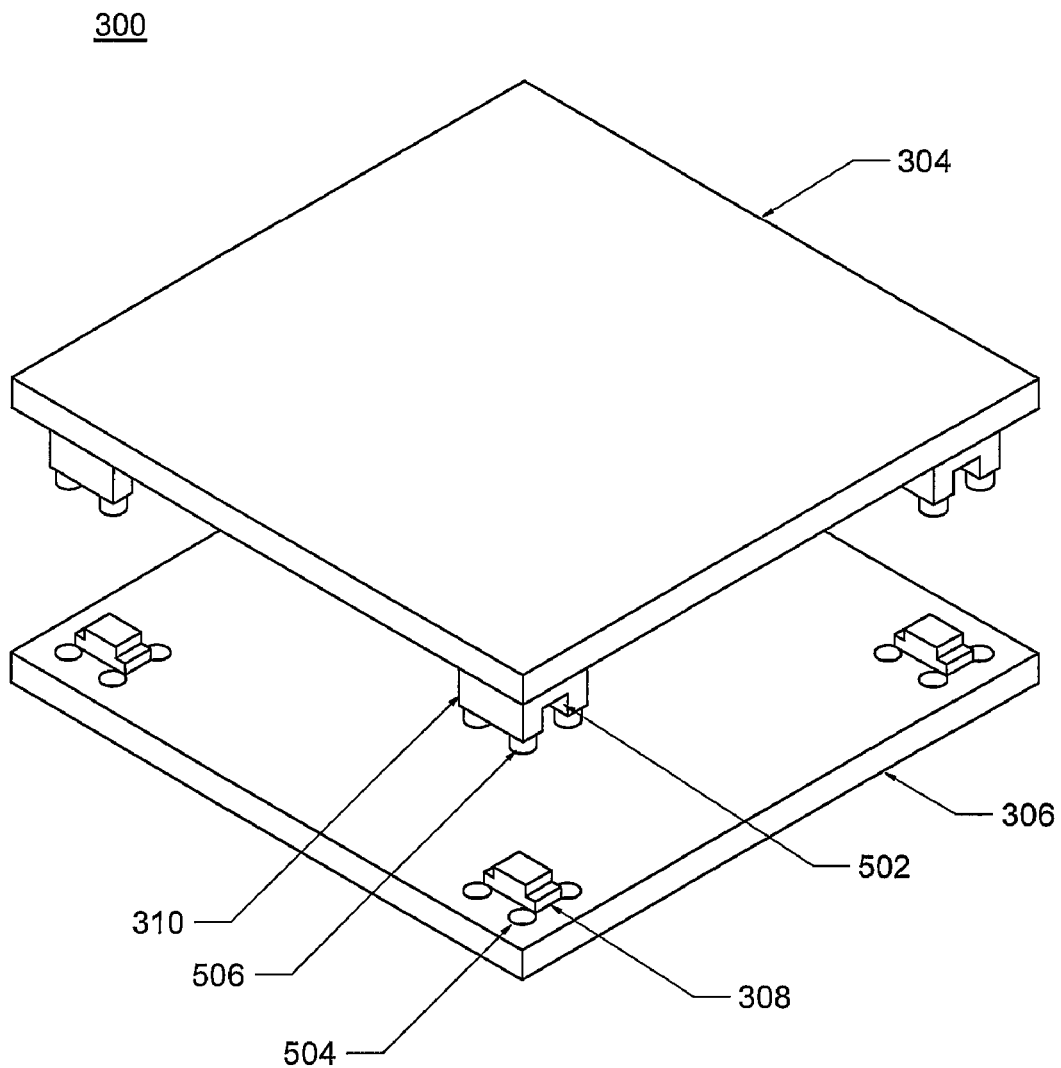
FIG. 5 illustrates an exploded isometric view of components of the enclosure of FIG. 3 in an exemplary embodiment of the invention.

FIG. 5 illustrates an exploded isometric view of components of enclosure 300 in an exemplary embodiment of the invention. More specifically, FIG. 5 illustrates a spacer 310 fitting over a light source 308. Spacer 310 may include a chamber 502 adapted to fit around light source 308. Light is transmitted from light source 308 through diffuser 304 to LCD glass 102 (not shown in FIG. 5).

Spacer 310 may also include a plurality of posts 506 for securing the components of enclosure 300. Back plate 306 may include a plurality of holes 504 surrounding each light source 308. For example, light source 308 of FIG. 5 has a hole on each corner of light source 308. Holes 504 are adapted to receive a corresponding post 506 and secure diffuser 304, spacer 310 and back plate 306. This structure gives enclosure 300 significant rigidity even when enclosure 300 is relatively thin. As a result, the electronic device may not need a hard plastic or metal case around the components of enclosure 300. Rather, a case of an electronic device utilizing enclosure 300 may comprise a band which wraps around enclosure 300. A securing apparatus, such as a screw, may be attached to post 506 underneath back plate 306 to secure post 504 in place.

Figure 6:
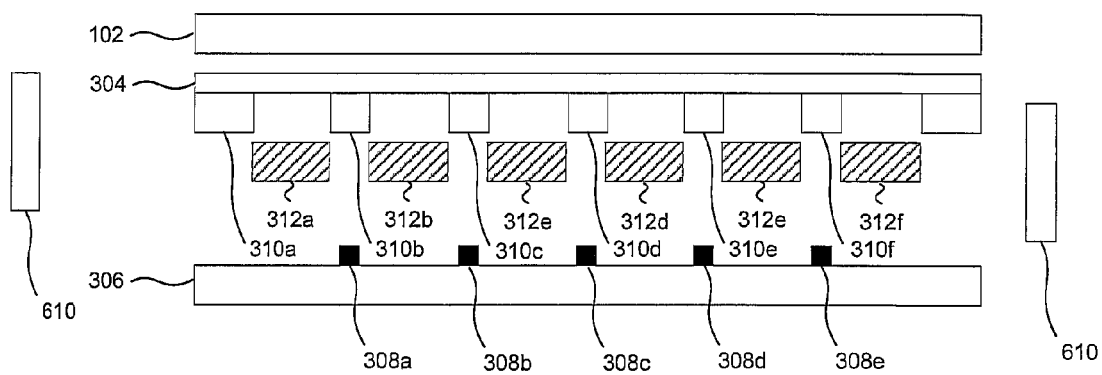
FIG. 6 illustrates an exploded side view of an electronic device in an exemplary embodiment of the invention.
Figure 7:
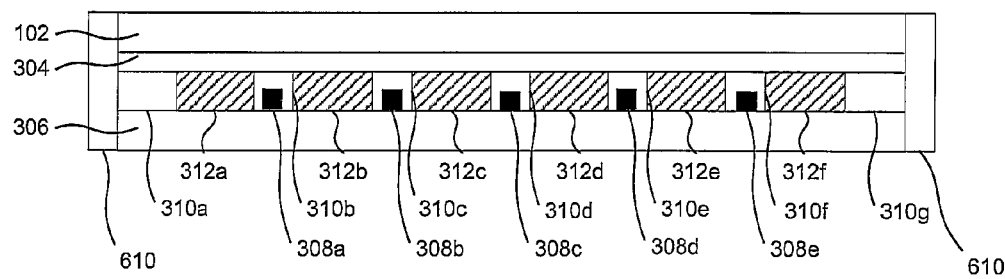
FIG. 7 illustrates an assembled side view of the electronic device of FIG. 6 in an exemplary embodiment of the invention.

FIG. 6 illustrates an exploded side view of an electronic device 600 in an exemplary embodiment of the invention. Electronic device 600 includes the components of enclosure 300 described above in FIGS. 3-4. Electronic device 600 also includes a band structure 610 which wraps around LCD glass 102, diffuser 304 and back plate 306. Band structure 610 may be a single piece of material which wraps around all four sides of electronic device 600 (band structure 610 is not shown along the front of electronic device 600 so as to not obscure the view of internal components of electronic device 600). Band structure 610 may be rubber or another similar soft material, and adapted to protect internal components of electronic device 600. Alternatively, band structure 610 may be a strip of harder material, such as plastic or metal, which fits around components of electronic device 600. Band structure 610 may also comprise multiple pieces or strips which are secured or affixed to electronic device 600. FIG. 7 illustrates an assembled side view of electronic device 600 of FIG. 6 in an exemplary embodiment of the invention.

Figure 8:
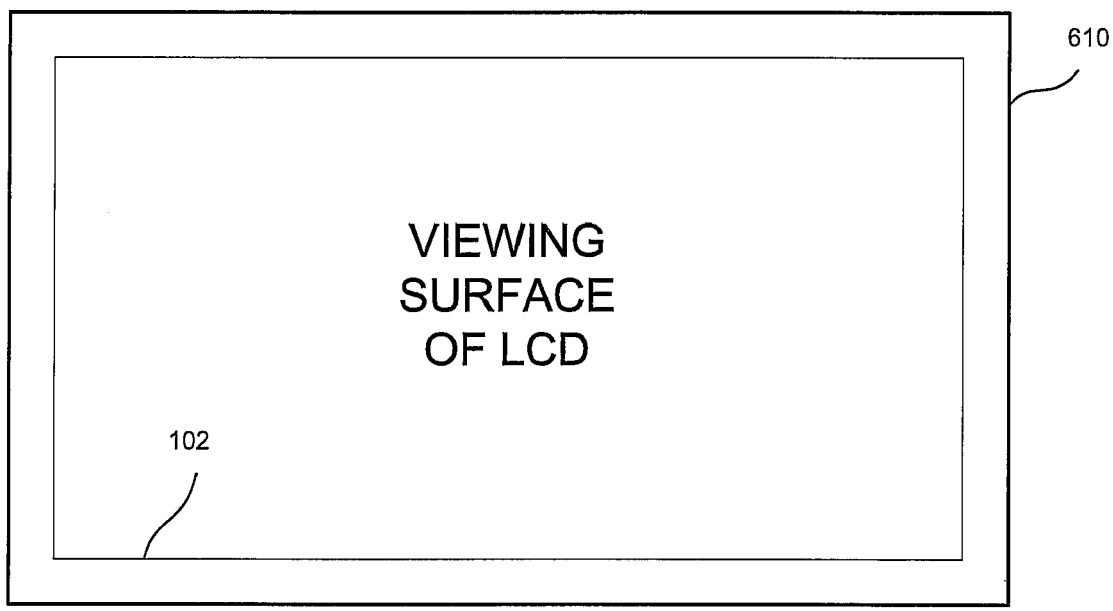
FIG. 8 illustrates a top view of an electronic device in exemplary embodiment of the invention.

FIG. 8 illustrates a top view of electronic device 600 in exemplary embodiment of the invention. Band structure 610 surrounds LCD glass 102 on all four sides. LCD glass 102 forms a top surface of electronic device 600. Back plate 306 (not visible on FIG. 8) may form a bottom surface of electronic device 600. LCD glass 102, as well as other internal components of electronic device 600, are protected from damage on the sides by band structure 610.

Figure 9:
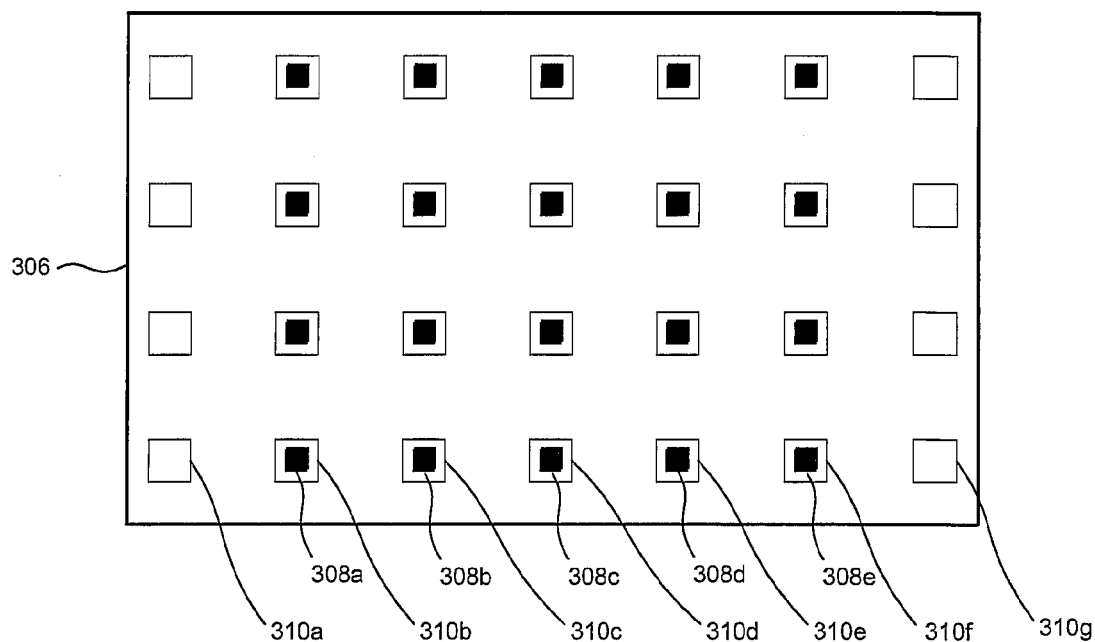
FIG. 9 is a top view of the enclosure of FIG. 3 in an exemplary embodiment of the invention.

As discussed above, electrical components 312 of FIG. 3 may be any type of structure placed within spacers 310. For example, electrical components 312 may comprise circuit boards or other electrical components which fit within spacers 310 and are secured by contact pressure with spacers 310. FIG. 9 is a top view of enclosure 300 of FIG. 3 in an exemplary embodiment of the invention. More specifically, FIG. 9 illustrates a grid pattern of spacers 310 disposed on back plate 306.

Spacers 310 may be equally spaced apart in an X-direction and a Y-direction of enclosure 300. Electrical components may be placed in the space between four or more spacers 310. If spacers 310 are equally spaced apart, then the sides of electrical components 312 (not shown in FIG. 9) may be multiples of a base value, with the base value being equal to the distance between the centers of two spacers. Thus, different sized electrical components may be placed within enclosure 300.

Figure 10:
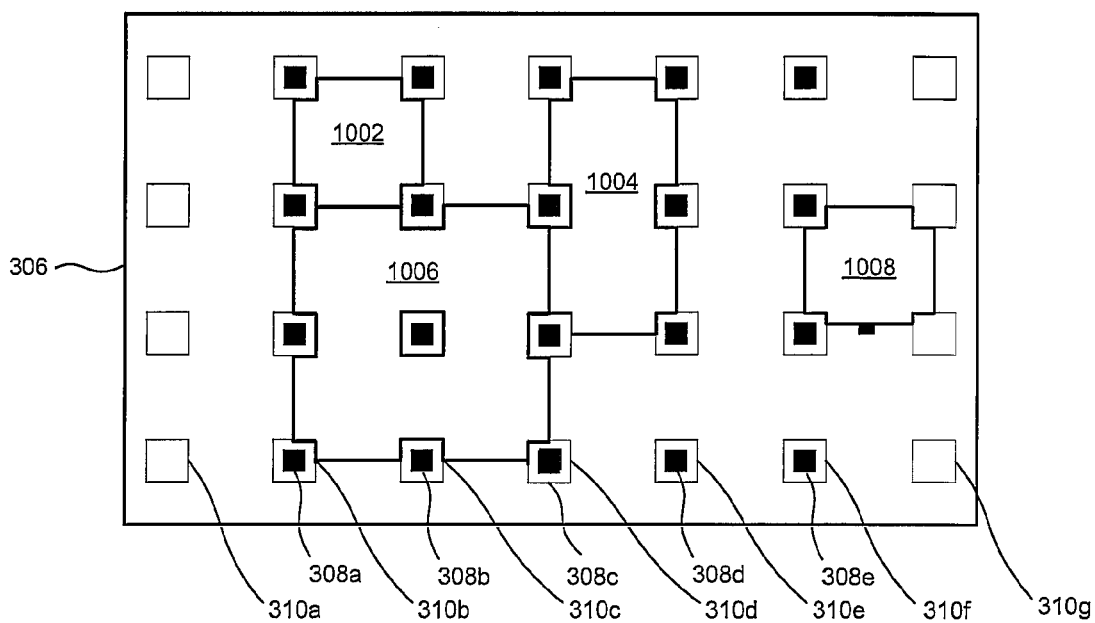
FIG. 10 is a top view of electrical components secured within the enclosure of FIG. 3 in an exemplary embodiment of the invention.

For example, referring to FIG. 10, an electrical component 1002 is illustrated secured between four spacers 310. Electrical component 1002 is a 1×1 component, because each side of electrical component 1002 is the same size as the distance between the centers of two spacers 310. Exemplary dimensions of electrical component 1002 are 25.6 mm by 25.6 mm. Electrical component 1002 is illustrated with cut-outs on each of the four corners of electrical component 1002. Each cut-out of electrical component 1002 passes through a spacer 310 to secure electrical component 1002 in place in an X-direction and a Y-direction of enclosure 300. Each cut-out of electrical component 1002 may be for example 2 mm by 2 mm. Each cut-out of electrical component 1002 fits around one fourth of the perimeter of a spacer 310, so each spacer may have dimensions of 4 mm by 4 mm. An electrical component may be a circuit board, memory module, processor, electronic module, storage medium, etc.

FIG. 10 also illustrates electrical component 1004, which is a 2×1 component. Electrical component 1004 is twice the length as electrical component 1002, but has the same width as electrical component 1002. Electrical component 1004 includes six cut-outs, one on each corner of electrical component 1004, and two cut-outs in the middle along the longest edge of electrical component 1004. The cut-outs in the middle of electrical component 1004 are twice as long as cut-outs of 1×1 electrical component 1002 to fit along half the perimeter of a spacer 310. Thus, the cut-outs may be 4 mm by 2 mm. The cut-outs on the corners of electrical component 1004 are the same size as the cut-outs of 1×1 electrical component 1002 (e.g., 2 mm by 2 mm).

Electrical component 1006 is a 2×2 component (e.g., is twice the length and twice the width of electrical component 1002). Thus, electrical component 1006 may be for example 51.2 mm by 51.2 mm. Electrical component 1006 includes nine cut-outs, four on each corner of electrical component 1006, one cut-out in the center of electrical component 1006, and one cut-out in the middle of each side of electrical component 1006. The cut-out in the center of electrical component 1006 is four times (e.g., 4 mm by 4 mm) the size of the cut-outs of electrical component 1002 to fit entirely around one spacer 310. The cut-outs on each edge of electrical component 1006 are similar in size (e.g., 4 mm by 2 mm) to the larger cut-outs of electrical component 1004.

FIG. 10 also illustrates battery 1008 secured between four spacers 310. Battery 1008 has cut-outs to secure it in place between spacers 310. However, those of ordinary skill in the art will recognize that standard batteries may be used and placed between any number of spacers 310. Further, batteries may be secured by straps, battery enclosures, etc., mounted to back plate 306 or another structure of enclosure 300. Back plate 306 may include bus lines, connection lines, etc., for connecting various electrical components, such as electrical component 1002, electrical component 1004, electrical component 1006 and battery 1008. Electrical components may also be placed together and electrically connected through jumper wires, sockets, cables, etc.

Figure 11:
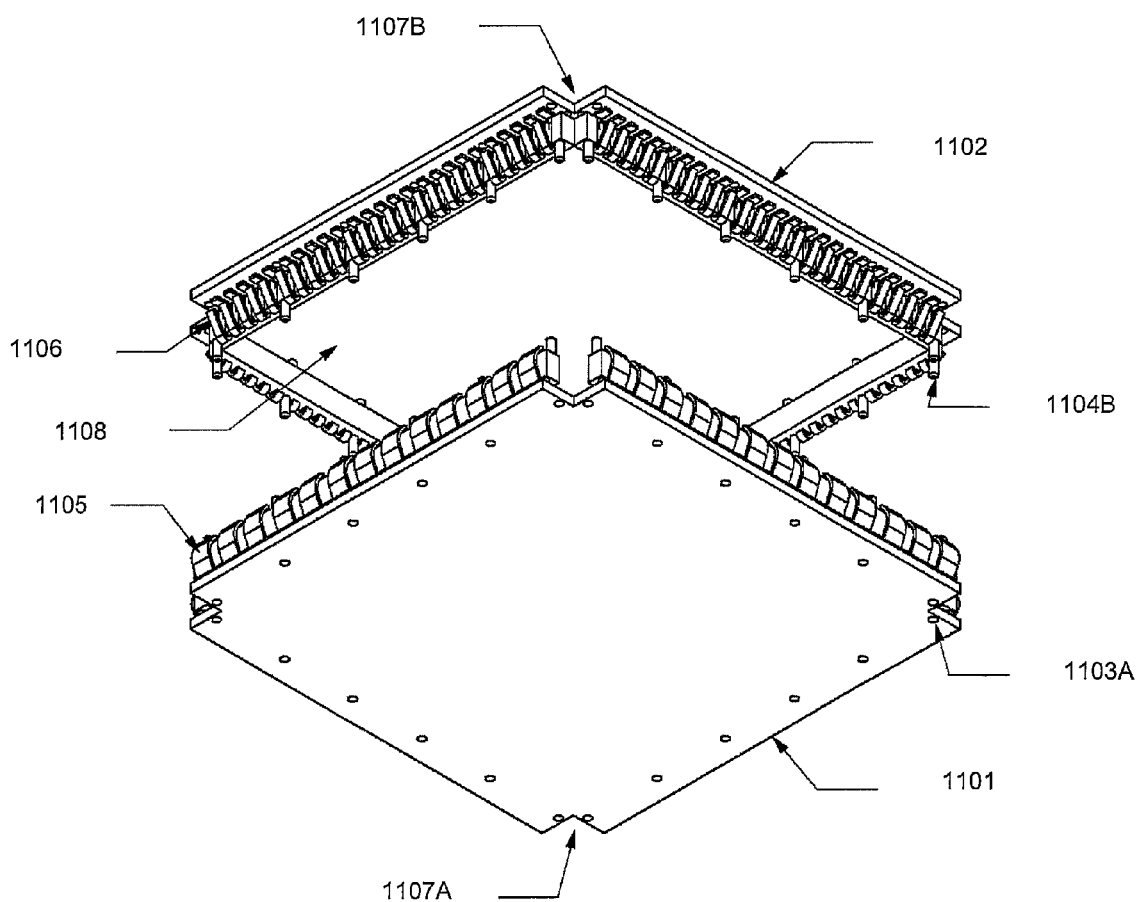
FIG. 11 is an exploded isometric view of a module in an exemplary embodiment of the invention

In another exemplary embodiment of the invention, spacers 310 may secure modular electrical components, which have uniform base dimensions in the X, Y and Z directions of enclosure 300. FIG. 11 is an exploded isometric view of a module 1100 in an exemplary embodiment of the invention. FIG. 11 illustrates an internal view of the top of module 1100.

Module 1100 includes a bottom circuit board 1101 and a top circuit board 1102. Bottom circuit board 1101 has a first surface (not visible in FIG. 11) which is disposed facing a first surface 1108 of top circuit board 1102. The terms top and bottom are used for illustrative purposes only. Module 1100 may be oriented in any number of directions such that bottom circuit board 1101 and top circuit board 1102 may be disposed in opposite positions, or may comprise opposite sides of module 1100.

Figure 12:
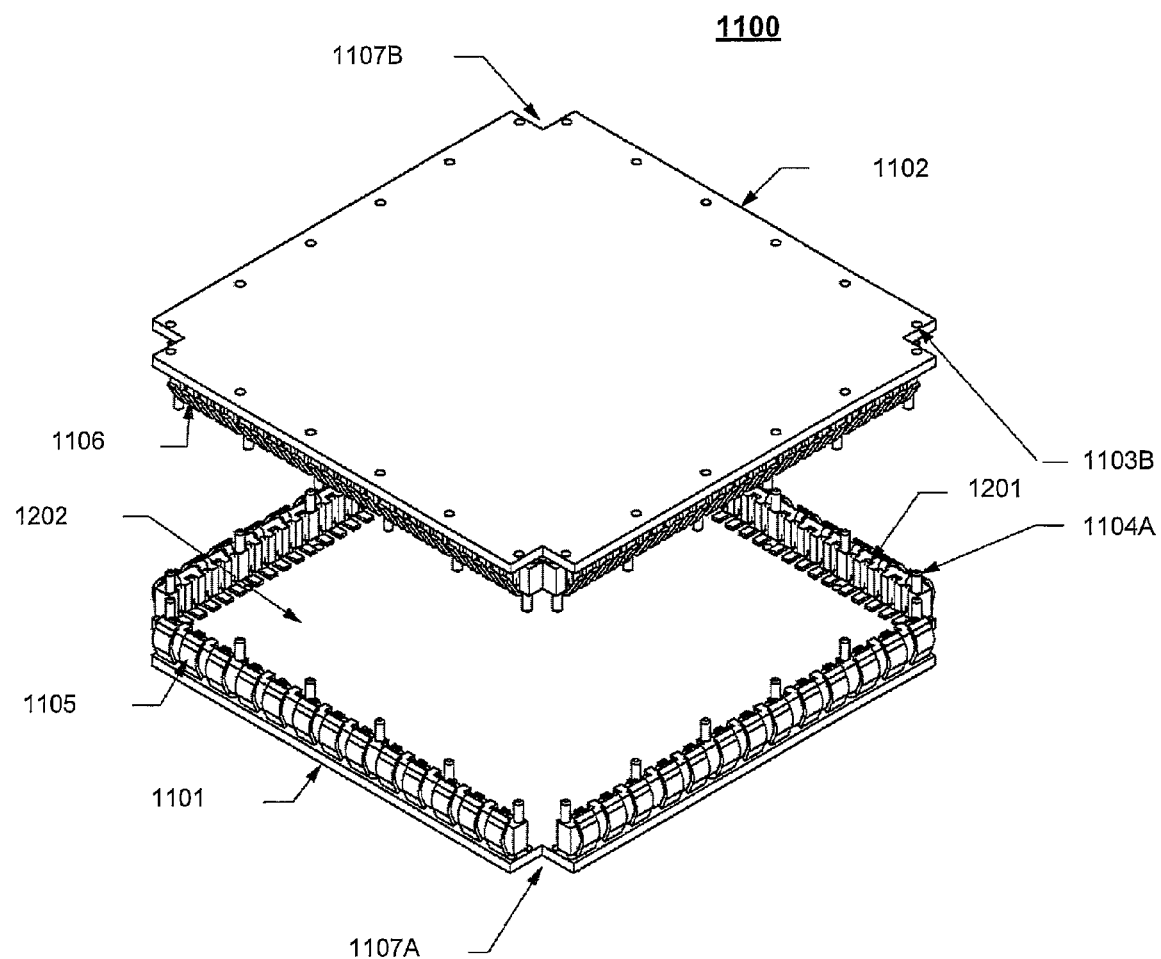
FIG. 12 is another exploded isometric view of the module of FIG. 11 in an exemplary embodiment of the invention.

FIG. 12 is another exploded isometric view of module 1100 in an exemplary embodiment of the invention. FIG. 12 illustrates an internal view of bottom circuit board 1101 of module 1100. Module 1100 includes an apparatus adapted to physically and electrically couple bottom circuit board 1101 and top circuit board 1102. To electrically couple bottom circuit board 1101 and top circuit board 1102, the apparatus comprises a plurality of bottom internal connectors 1201 coupled to bottom circuit board 1101 and a plurality of top internal connectors 1106 coupled to top circuit board 1102. Top internal connectors 1106 and bottom internal connectors 1201 are spring leaf connectors which matingly engage to electrically couple bottom circuit board 1101 and top circuit board 1102. Additionally, external connector 1105 of module 1100 makes physical contact with a like external connector of another module to electrically couple the two modules. Therefore, any signal that is transmitted through bottom internal connector 1201 and top internal connector 1106 is also transmitted to another module through the pair of external connectors 1105.

Figure 13:
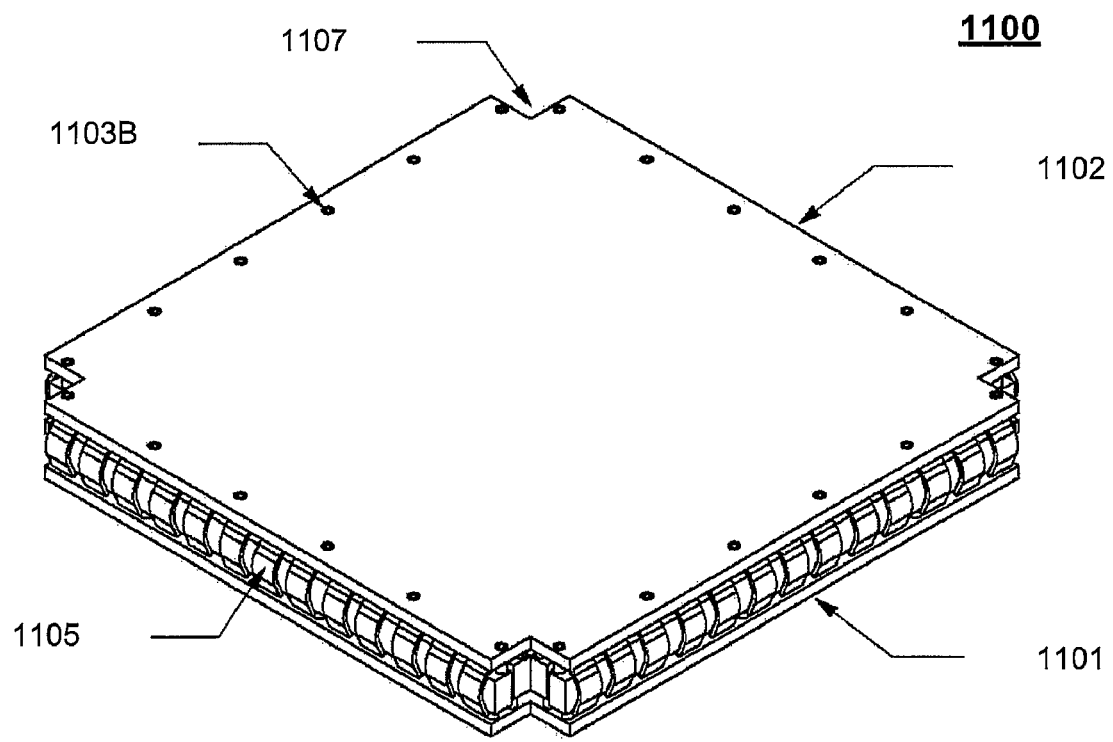
FIG. 13 is an isometric view of the module of FIG. 11 in an exemplary embodiment of the invention.

A portion of external connectors 1105 may be electrically coupled to bottom internal connectors 1201 to electrically couple bottom circuit board 1101 and top circuit board 1102 with the other module. As illustrated in FIGS. 12 and 13, there are thirteen external connectors 1105 on each side of module 1100, which are connected to bottom internal connectors 1201. Thus, thirteen pairs of external connectors 1105 and top internal connectors 1106 may be electrically coupled to another module on each side of module 1100. The remaining twelve pairs of bottom internal connectors 1201 and top internal connectors 1106 on each side of module 1100 are not electrically coupled to other modules. Module 1100 as illustrated may be electrically coupled to four other modules, one on each side of module 1100. Even though twenty-five pairs of bottom internal connectors 1201 and top internal connectors 1106 are illustrated on each side of module 1100, any number of pairs of bottom internal connectors 1201 and top internal connectors 1106 may be disposed on each side of module 1100 depending on desired design criteria.

To physically couple bottom circuit board 1101 and top circuit board 1102, the apparatus further includes a plurality of holes 1103A and 1103B disposed near each edge of first surface 1108 of bottom circuit board 1101 and near each edge of first surface 1202 of top circuit board 1102. Each hole 1103A and 1103B is adapted to receive a corresponding post 1104A or 1104B coupled to the opposite side of module 1100 and physically couple bottom circuit board 1101 and top circuit board 1102. Bottom circuit board 1101 and top circuit board 1102 may be physically connected using different techniques other than using pairs of posts 1104A and 1104B and holes 1103A and 1103B. For example, bottom circuit board 1101 and top circuit board 1102 may be coupled using screws, thermal bonding, adhesives, etc.

Bottom circuit board 1101 includes a plurality of cut-outs 1107A on each corner of bottom circuit board 1101. Top circuit board 1102 includes a corresponding plurality of cut-outs 1107B on each corner of top circuit board 1102. The cut-outs 1107A and 1107B are adapted to secure module 1100 in place between spacers 310 of enclosure 300 of FIG. 3.

FIG. 13 is an isometric view of module 1100 in an exemplary embodiment of the invention. More specifically, FIG. 13 illustrates the final assembly of module 1100 after bottom circuit board 1101 and top circuit board 1102 are physically and electrically coupled. While module 1100 is illustrated as a square, module 1100 may be other types of parallelepipeds, such as a rectangle. Module 1100 could even be other shapes, such as L-shaped or U-shaped. For example, an L-shaped module may comprise three or more 1×1 modules, and a U-shaped module may comprise five or more 1×1 modules.

To minimize a height of module 1100, components may be disposed on both bottom circuit board 1101 and top circuit board 1102. Preferably, components disposed on bottom circuit board 1101 and top circuit board 1102 are staggered to avoid having two large components on corresponding locations of bottom circuit board 1101 and top circuit board 1102. If one large component is disposed on bottom circuit board 1101, and a second large component is disposed on top circuit board 1102 immediately above the large component on bottom circuit board 1101, then the height of module 1100 may become larger than necessary. Thus, it may be beneficial to place a large component on bottom circuit board 1101, and place a small component in the corresponding location on top circuit board 1102 above the large component. Likewise, a large component may be placed next to the small component on top circuit board 1102, and a small component may be placed on bottom circuit board 1101 below the large component on top circuit board 1102. Further, if a relatively large component is placed on either bottom circuit board 1101 or top circuit board 1102, then the corresponding location on the other circuit board may be left empty to minimize the overall height of module 1100. This staggering of components is advantageous, because a minimum height of the module is kept as small as physically possible depending on the largest component that may be disposed on bottom circuit board 1101 or top circuit board 1102.

Figure 14:
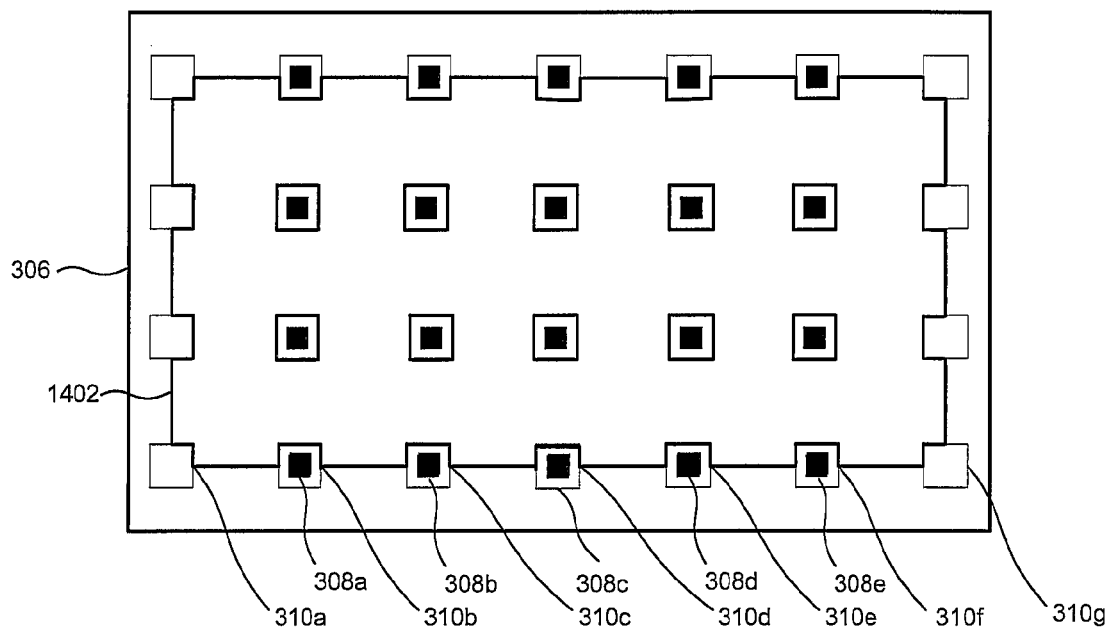
FIG. 14 illustrates an electrical component, which has a plurality of cut-outs corresponding to spacers of the enclosure of FIG. 3 in an exemplary embodiment of the invention.

Electrical components 312 of FIG. 3 may also be a single component or circuit board with cut-outs adapted to pass through all of spacers 310 of enclosure 300. FIG. 14 illustrates an electrical component 1402, which has a plurality of cut-outs corresponding to spacers 310 of enclosure 300 in an exemplary embodiment of the invention. Electrical component 1402 may be a circuit board which has a processor, memory, storage mediums, etc., of an electronic device. Spacers 310 secure electrical component 1402 in an X-direction and Y-direction of enclosure 300. Electrical component 1402 may be appropriately sized to securely fit between back plate 306 and diffuser 304 to be secured in a Z-direction of enclosure 300. Alternatively, electrical component 1402 may be secured by other means, such adhesives, or may be screwed or otherwise mechanically secured to back plate 306.

Figure 15:
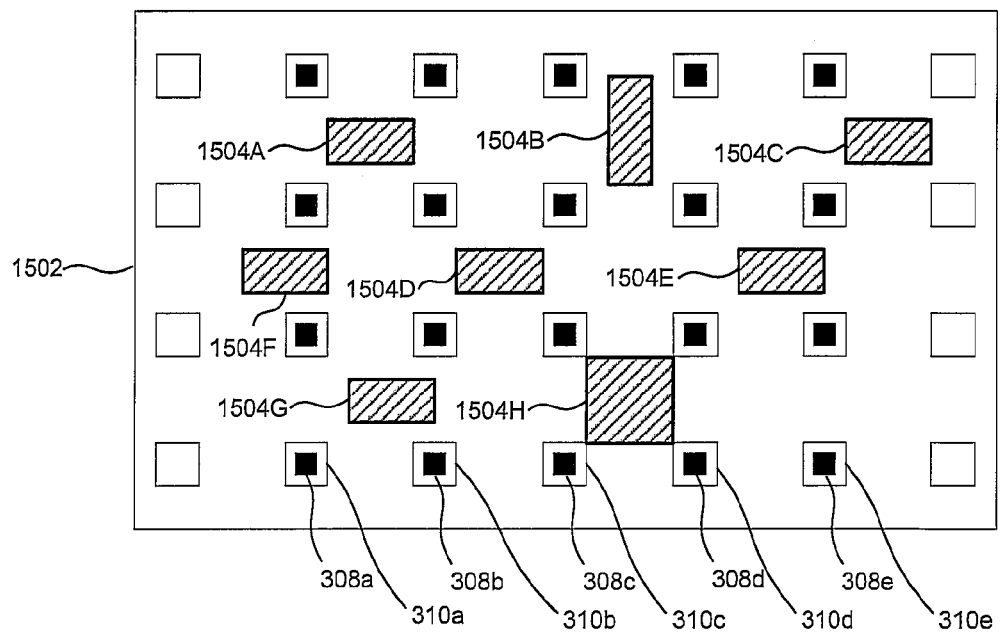
FIG. 15 illustrates a top view of an enclosure utilized within an electronic device in an exemplary embodiment of the invention.

In another exemplary embodiment of the invention, back plate 306 of FIG. 3 may comprise a main circuit board of an electronic device. Thus, back plate 306 may include processors, memory, storage mediums, etc., of the electronic device. FIG. 15 illustrates a top view of an enclosure 1500 utilized within an electronic device in an exemplary embodiment of the invention. More specifically, FIG. 15 illustrates a top view of a main circuit board 1502 of the electronic device.

Main circuit board 1502 includes a plurality of light sources 308 disposed along the surface. A spacer 310 is placed above each light source 308. Main circuit board 1502 includes a plurality of components 1504a to 1504h disposed between light sources 308. Each component 1504 may be disposed at least a minimum distance away from a light source 308 so that components 1504 don't obstruct spacers 310. The minimum distance may be selected based on the dimensions of spacers 310. Thus, if each spacer is 4 mm by 4 mm, then the minimum distance may be at least 2 mm from the center of light source 308. Main circuit board 1502 may also include circuitry for controlling light sources 308 and/or LCD glass 102 (not shown in FIG. 15).

Figure 16:
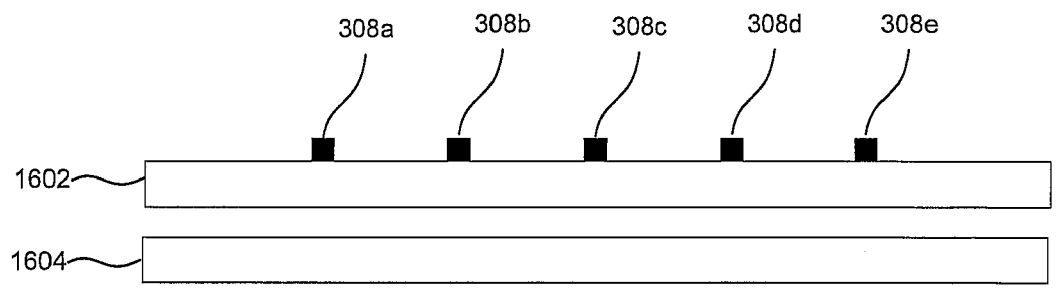
FIG. 16 illustrates an exploded side view of a multi-layered back plate with a heat spreader in an exemplary embodiment of the invention.

To dissipate heat generated by electrical components, back plate 306 may also comprise multiple layers including a heat spreading layer. FIG. 16 illustrates an exploded side view of a multi-layered back plate 306 with a heat spreader in an exemplary embodiment of the invention. Back plate 306 comprises a circuit board 1602 with circuitry for controlling light sources 308 disposed on the surface of circuit board 1602. Back plate 306 also comprises a heat spreader 1604 for dissipating heat from light sources 308 as well as electrical components housed within enclosure 300. Heat spreader 1604 may form a back surface of an electronic device, such as a PDA. LCD displays are sensitive to high temperatures, so heat spreader 1604 allows for more adequate dissipation of heat which may adversely affect the display capability of LCD glass 102.

Design criteria may dictate different placements of light sources 308 of FIG. 3. For example, a light source 308 may not be placed below each spacer 310. Rather, only a selected portion of spacers 310 may be used to transmit light to diffuser 304. Other spacers 310 may be used for other purposes, such as securing the layers of enclosure 300.

Figure 17:
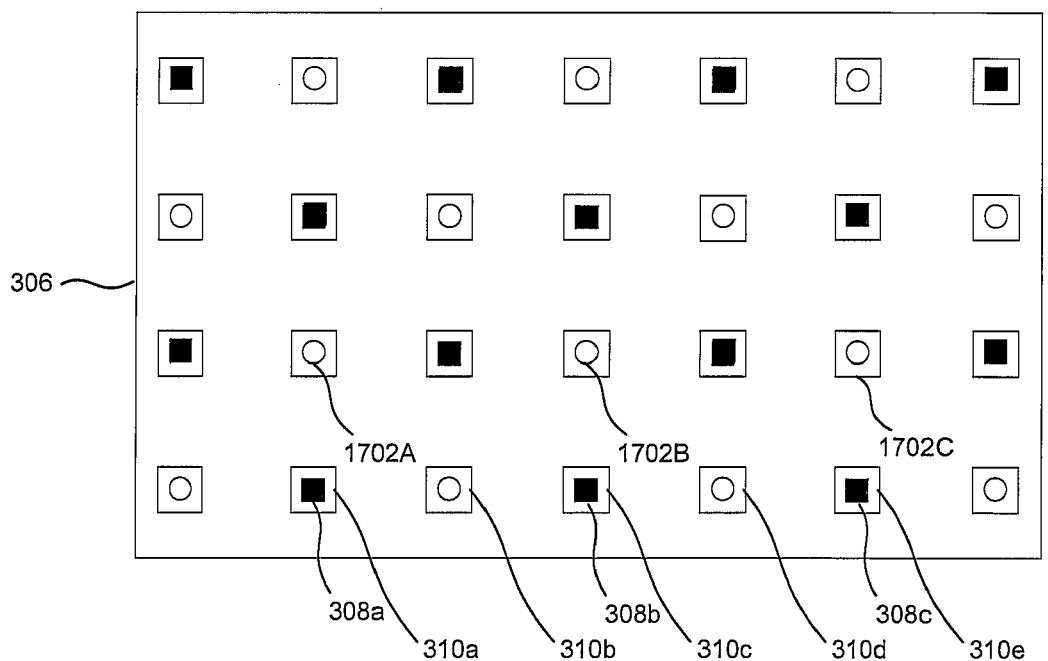
FIG. 17 illustrates a top view of an enclosure of FIG. 3 wherein a portion of the spacers are adapted to receive a securing apparatus to secure the layers of the enclosure in an exemplary embodiment of the invention

FIG. 17 illustrates a top view of an enclosure 1700 with a portion of spacers 310 adapted to receive an apparatus to secure the layers of enclosure 1700 in an exemplary embodiment of the invention. Some spacers 310 are adapted to fit over a light source 308 disposed on back plate 306. Other spacers 310 include a hole, such as holes 1802a to 1802c for receiving a securing apparatus, such as a screw. Back plate 306 may include holes (not shown) corresponding to holes 1802 of spacers 310.

A screw may be inserted from a back surface of back plate 306 and screwed into a hole 1802 of a spacer 310. If spacers 310 and diffuser 304 (not shown in FIG. 17) are a single piece of material, then a screw will secure diffuser 304, spacers 310 and back plate 306. This gives significant rigidity to enclosure 300 as described above, allowing for the elimination of a hard outer case of an electronic device if desired.

Figure 18:
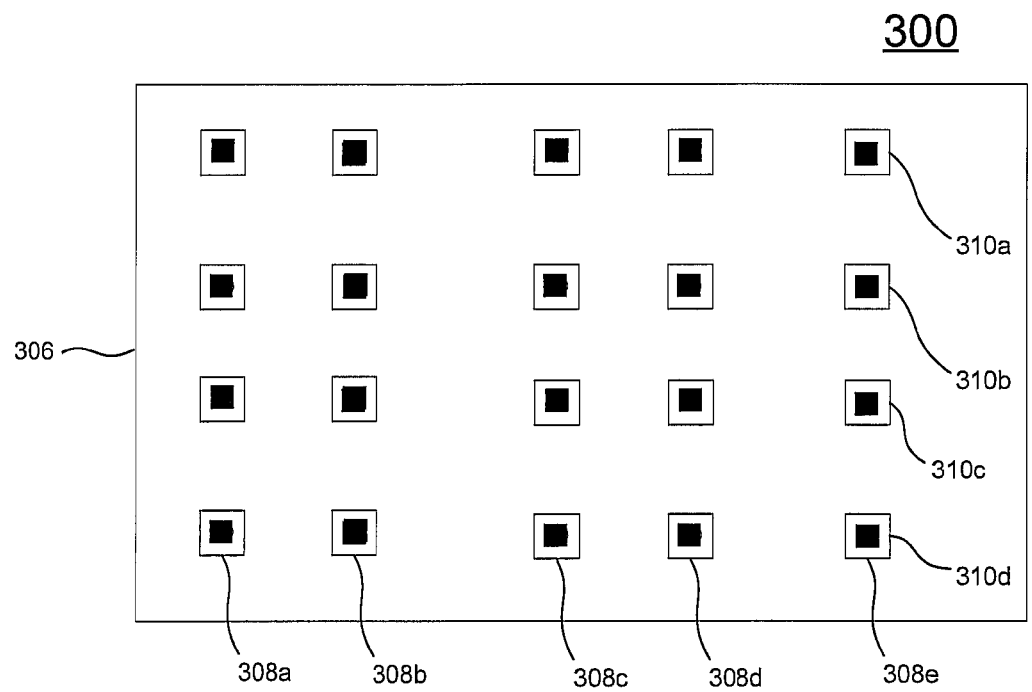
FIG. 18 illustrates a top view of an enclosure with spacers which are unevenly spaced in an exemplary embodiment of the invention.

Additionally, light sources 308 and spacers 310 don't need to be arranged in a grid pattern, with each light source 308 and spacer 310 equally spaced apart. Rather, light sources 308 and spacers 310 may be unevenly spaced, as illustrated in FIG. 18. By arranging spacers 310 and light sources 308 in non-grid patterns, enclosure 300 may be adapted to accommodate different types and sizes of components within the various sized spaces between spacers 310.

Spacers 310 have been described as arranged in a grid pattern, where each spacer 310 is spaced equally apart from other spacers 310 in both an X-direction and a Y-direction of the grid pattern. However, design criteria may dictate that some spacers 310 are not needed in the grid pattern. For example, space in an enclosure may be selected to hold a component which is larger than a 1×1 base value component. Therefore, in some embodiments, a portion of the spacers 310 may be omitted from the grid pattern. For example, two adjoining spacers 310 may be placed two base value units of length apart, while other spacers 310 are placed one base value unit of length apart. This permits the utilization of the standard grid pattern, while accommodating large components without requiring cut-outs to be placed in the middle of the component.

Figure 19:
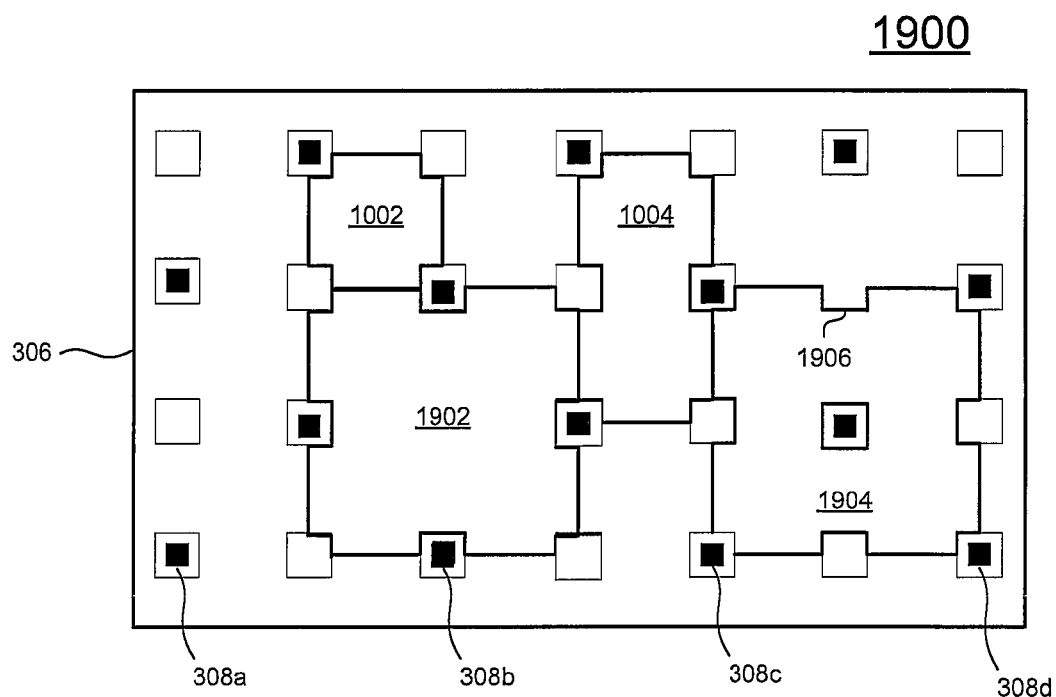
FIG. 19 illustrates a top view of an enclosure with spacers arranged in a grid pattern where some spacers in the grid pattern are omitted in an exemplary embodiment of the invention.

FIG. 19 illustrates a top view of an enclosure 1900 with spacers 310 of FIG. 3 arranged in a grid pattern with some spacers 310 omitted in an exemplary embodiment of the invention. Thus, large components or modules, such as component 1902 may be accommodated without requiring cut-outs in the middle of the component. Rather, component 1902 may have cut-outs only along the outer perimeter, and may still be able to fit within the grid pattern of enclosure 1900. Other large components may still include cut-outs in the middle or side edges of the component, and will properly fit within a space omitting a spacer 310. For example, component 1904 has a cutout 1906 in the middle of one side, even though no spacer 310 is present at that particular point. However, the contact pressure of the other spacers 310 will still secure component 1904 in place.

Figure 20:
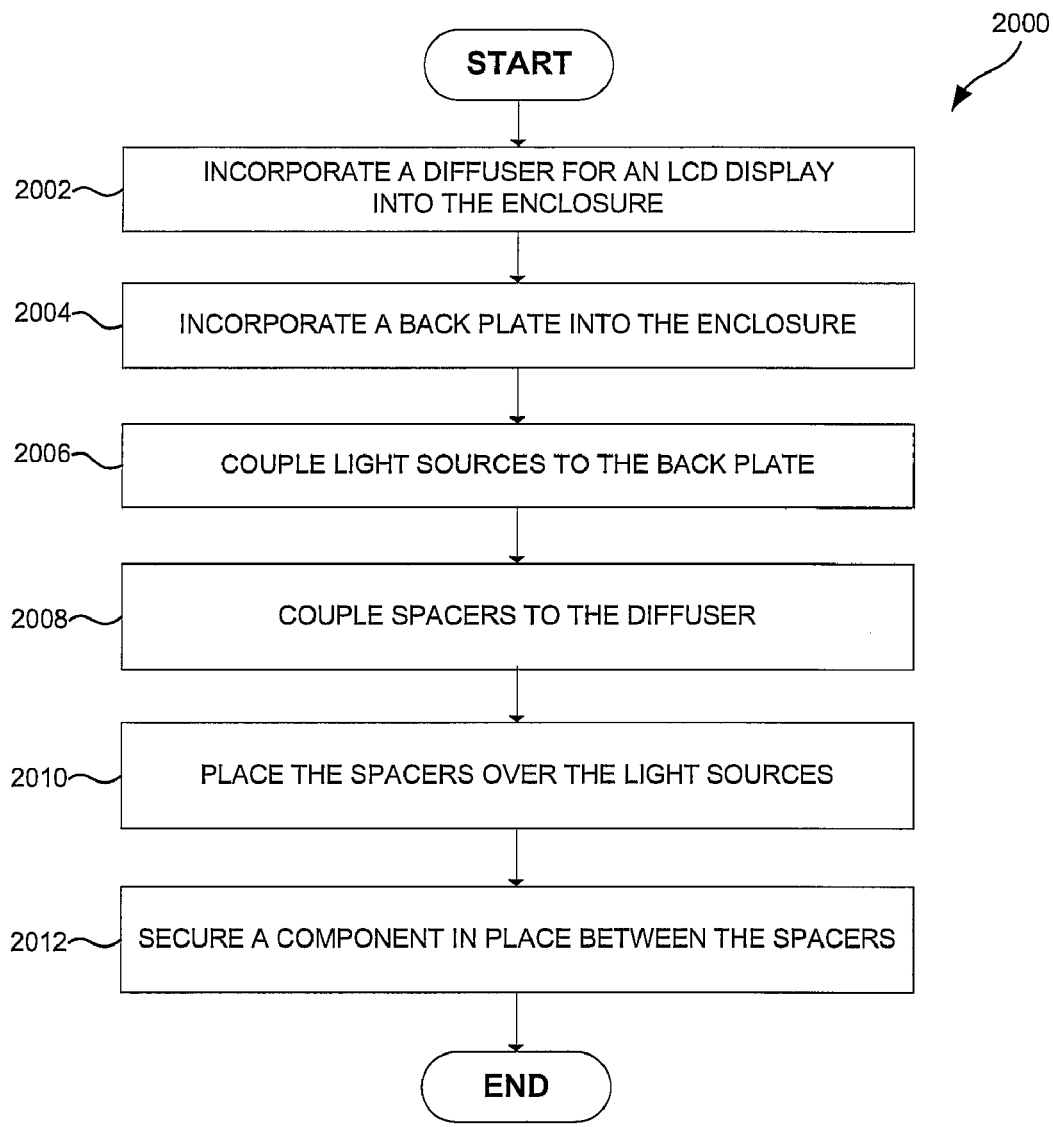
FIG. 20 illustrates a flow chart of a method for housing electrical components in an enclosure with integrated backlight for an LCD.

FIG. 20 illustrates a flow chart of a method for housing electrical components in an enclosure (e.g., enclosure 300 of FIG. 3) with integrated backlight for an LCD. The steps of method 2000 will be discussed in regard to enclosure 300 illustrated in FIGS. 3-4. The steps of method 2000 are not all-inclusive, and may include other steps not shown for the sake of brevity.

Step 2002 comprises incorporating a diffuser 304 for an LCD display of an electronic device into enclosure 300. Step 2004 comprises incorporating a back plate 306 into enclosure 300. A plurality of light sources 308 are coupled to back plate 306 in step 2006 to provide backlight for the LCD. Step 2008 comprises optically coupling a plurality of spacers 310 to diffuser 304. Step 2010 comprises optically coupling spacers 310 to light sources 308 to transmit light from light sources 308 to diffuser 304. Step 2012 comprises securing at least one electrical component 312 in place between spacers 310.

Although specific embodiments were described herein, the scope of the invention is not limited to those specific embodiments. The scope of the invention is defined by the following claims and any equivalents therein.

I claim:

1. An enclosure of an electronic device with integrated backlight for housing electrical components for a liquid crystal display (LCD), the enclosure comprising:
    a diffuser;
    a plurality of light sources adapted to provide backlight for the LCD,
    characterized in that the enclosure further comprises:
    a plurality of spacers optically coupled to the diffuser and optically coupled to the plurality of light sources and adapted to transmit light from the plurality of light sources to the diffuser, the plurality of spacers further adapted to secure at least one electrical component in place between the plurality of spacers.

2. The enclosure of claim 1 further comprising:
    a back plate, and
    wherein the plurality of light sources are coupled to the back plate.

3. The enclosure of claim 2, wherein the back plate comprises a heat spreader.

4. The enclosure of claim 2, wherein the back plate comprises a main circuit board for the electronic device.

5. The enclosure of claim 2, wherein a portion of the plurality of spacers comprise a means for receiving a securing apparatus to secure the back plate, the spacers and the diffuser.

6. The enclosure of claim 1, wherein the at least one electrical component comprises:
    a cut-out on each of the four corners of the at least one electrical component, each cut-out adapted to pass through a spacer to secure the at least one electrical component in place around the spacer.

7. The enclosure of claim 1, wherein the plurality of spacers are arranged in a grid pattern, each spacer being equally spaced apart in an X-direction and a Y-direction of the enclosure.

8. The enclosure of claim 7, wherein the at least one electrical component comprises a circuit board having:
   a cut-out on each of the four corners of the circuit board, each cut-out adapted to pass through a spacer to secure the circuit board in place around the spacer; and
   wherein sizes of each edge of the circuit board are integer multiples of a base value, with the base value equal to a distance between centers of two of the plurality of spacers.

9. The enclosure of claim 7, wherein the at least one electrical component comprises a module including:
   a first circuit board having a first surface;
   a second circuit board having a first surface, the first surface of the second circuit board disposed facing the first surface of the first circuit board;
   an apparatus adapted to physically and electrically couple the first circuit board and the second circuit board, and further adapted to matingly engage the module with a second module; and
   a cut-out on each of the four corners of the first and second circuit boards, each cut-out adapted to pass through a spacer to secure the module in place around the spacer;
   wherein sizes of each edge of the circuit board are integer multiples of a base value, with the base value equal to a distance between centers of two of the plurality of spacers.

10. The enclosure of claim 1, wherein the at least one electrical component comprises a battery.

11. An enclosure for housing electrical components of an electronic device with integrated backlight for a liquid crystal display (LCD), the enclosure comprising:
   an LCD glass;
   a diffuser below the LCD glass;
   a back plate comprising circuitry for controlling the LCD;
   a plurality of light sources coupled to the back plate and adapted to provide backlight for the LCD;
   a plurality of spacers optically coupled to the diffuser and optically coupled to the plurality of light sources and adapted to transmit light from the plurality of light sources to the diffuser, the plurality of spacers further adapted to secure at least one electrical component in place between the plurality of spacers; and
   an apparatus adapted to fit around the sides of the back plate, the diffuser, and the LCD glass to seal the enclosure.

12. The enclosure of claim 11, wherein the back plate comprises an aluminum heat spreader.

13. The enclosure of claim 11, wherein a portion of the plurality of spacers comprise a means for receiving a securing apparatus to secure the spacers, the diffuser and the back plate.

14. The enclosure of claim 11, wherein the plurality of spacers are arranged in a grid pattern, each spacer being equally spaced apart in an X-direction and a Y-direction of the enclosure.

15. The enclosure of claim 14, wherein the at least one electrical component comprises a circuit board, the circuit board comprising:
   a cut-out on each of the four corners of the circuit board, each cut-out adapted to pass through a spacer to secure the circuit board in place around the spacers; and
   wherein sizes of each edge of the circuit board are integer multiples of a base value, with the base value equal to a distance between centers of two of the plurality of spacers.

16. The enclosure of claim 11, wherein the at least one electrical component comprises a battery.

17. The enclosure of claim 11, wherein the apparatus adapted to fit around the sides of the back plate, the diffuser, and the LCD glass is made from a rubbery material to absorb shocks when the devise is jarred.

18. An enclosure for housing electrical components of an electronic device with integrated backlight for a liquid crystal display (LCD), the enclosure comprising:
   an LCD glass;
   a diffuser below the LCD glass;
   a back plate comprising circuitry for controlling the LCD, and further comprising a main circuit board for the electronic device;
   a plurality of light sources coupled to the back plate and adapted to provide backlight for the LCD; and
   a plurality of spacers optically coupled to the diffuser and optically coupled to the plurality of light sources and adapted to transmit light from the plurality of light sources to the diffuser;
   wherein the plurality of spacers are further adapted to secure at least one electrical component in place between the plurality of spacers.

19. The enclosure of claim 18 further comprising an apparatus adapted to fit around the back plate, the diffuser, and the LCD glass to seal the enclosure.

20. The enclosure of claim 18, wherein the at least one electrical component comprises:
   a cut-out on each of the four corners of the at least one electrical component, each cut-out adapted to pass through a spacer to secure the at least one electrical component in place around the spacer.

21. The enclosure of claim 18, wherein the plurality of spacers are arranged in a grid pattern, each spacer being equally spaced apart in an X-direction and a Y-direction of the enclosure.

22. The enclosure of claim 18, wherein the at least one electrical component comprises a circuit board including:
   a cut-out on each of the four corners of the circuit board, each cut-out adapted to pass through a spacer to secure the circuit board in place around the spacer; and
   wherein sizes of each edge of the circuit board are integer multiples of a base value, with the base value equal to a distance between centers of two of the plurality of spacers.

23. The enclosure of claim 18, wherein the back plate comprises an aluminum heat spreader.

24. The enclosure of claim 18, wherein a portion of the plurality of spacers comprise a means for receiving a securing apparatus to secure the spacers, the back plate and the diffuser.

25. A method for housing electrical components in an enclosure with integrated backlight for a liquid crystal display (LCD), the method comprising:
   incorporating a diffuser into the enclosure;
   incorporating a back plate into the enclosure;
   coupling a plurality of light sources to the back plate to provide backlight for the LCD;
   optically coupling a plurality of spacers to the diffuser;
   optically coupling the plurality of spacers to the plurality of light sources to transmit light from the plurality of light sources to the diffuser; and
   securing at least one electrical component in place between the plurality of spacers.

* * * * *